Dec. 22, 1931.    C. H. O. WITTIG    1,837,934
TRIAL FRAME
Filed Nov. 1, 1928
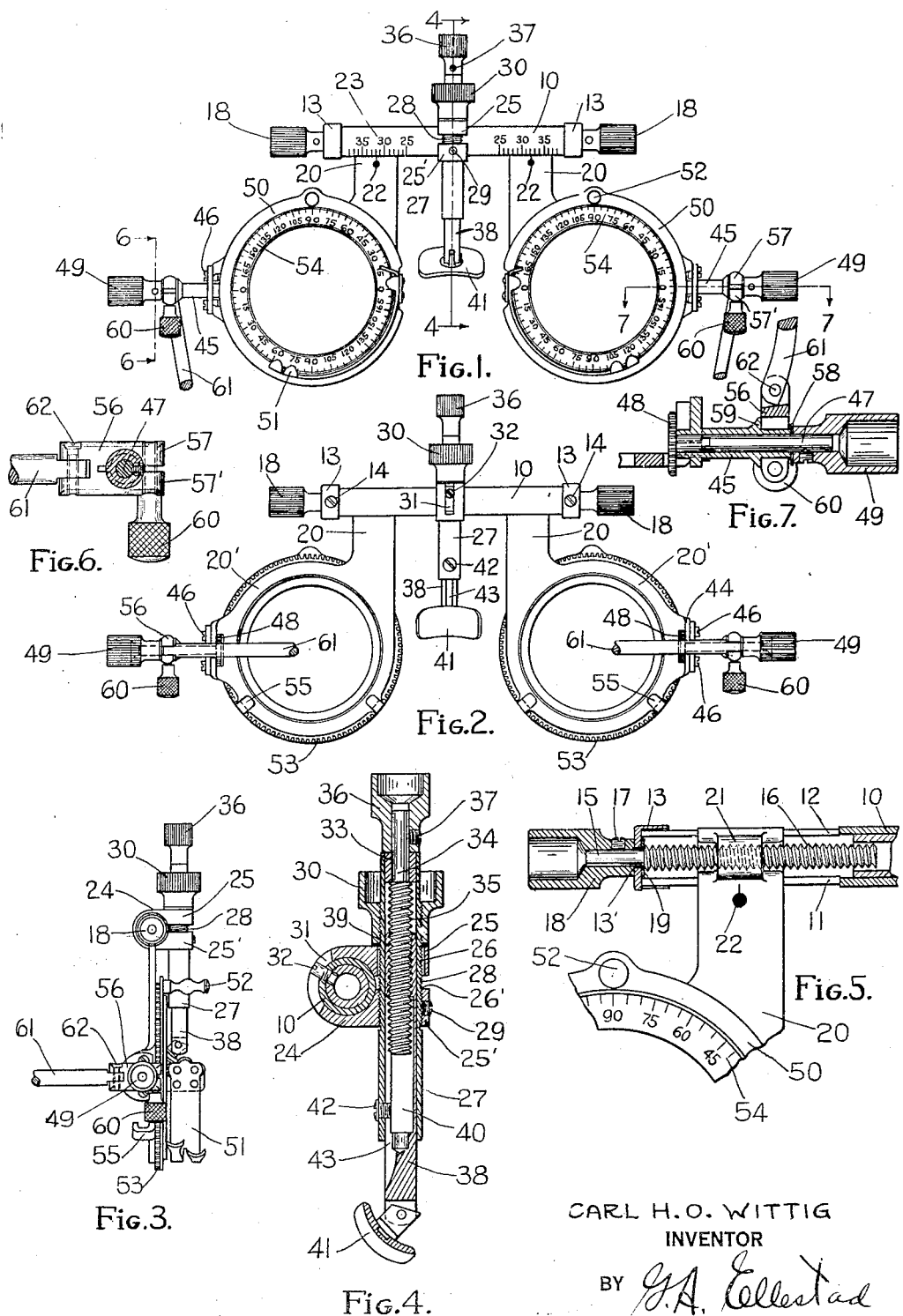
CARL H.O. WITTIG
INVENTOR
BY G.A. Ellestad
ATTORNEY Patented Dec. 22, 1931

1,837,934

UNITED STATES PATENT OFFICE

CARL H. O. WITTIG, OF IRONDEQUOIT, NEW YORK, ASSIGNOR TO BAUSCH & LOMB OPTICAL COMPANY, OF ROCHESTER, NEW YORK, A CORPORATION OF NEW YORK

TRIAL FRAME

Application filed November 1, 1928. Serial No. 316,416.

This invention relates to ophthalmic instruments and more particularly it has reference to a trial frame such as is used for holding test lenses, which are employed for determining the refractive errors of the eyes.

One of the objects of the present invention is to provide an improved trial frame which can be quickly and conveniently manipulated and adjusted to fit the facial characteristics of the wearer. Another object is to provide an improved means for adjusting the nose piece and a further object is to provide means for angularly adjusting the temples. To these and other ends the invention resides in certain novel features of construction, arrangement and combination of parts as will hereinafter be more fully described and pointed out in the appended claims.

Referring to the drawings:

Fig. 1 shows a front elevation of a trial frame embodying my invention.

Fig. 2 shows a rear elevation of the frame with temples broken away.

Fig. 3 is a side elevation of the frame, as viewed from the left of Fig. 1, with the temple only partly shown.

Fig. 4 is an enlarged vertical sectional view taken on line 4—4 of Fig. 1.

Fig. 5 is a view, partly in section, showing a detail.

Fig. 6 is a view taken on line 6—6 showing the temple adjusting means.

Fig. 7 shows a view taken on line 7—7.

Throughout the drawings, similar reference characters refer to the same parts.

A preferred embodiment of my invention is shown in the drawings wherein 10 indicates a horizontal tube having at each end thereof aligned slots, the lower one of which is indicated at 11 and the upper one at 12. Each end of the tube 10 is closed by a cap 13 which is secured thereto by screw 14. The cap 13 provides a bearing 13' in which is rotatably mounted the rod 15 having a threaded portion 16. Fixedly secured to the rod 15 by means of a screw 17 is the knurled knob or fingerpiece 18, which together with washer 19, prevents longitudinal movement of the rod 15.

A downwardly depending arm 20 terminates in a circular portion 20' which acts to support the lens cell and temple as will hereinafter be described. The arm 20 has, formed integral therewith at its upper end, a threaded nut 21 which cooperates with screw 16 so that rotation of the knob 18 causes the arm 20 to be moved back and forth in slots 11 and 12. This movement of the arm carries the lens cell, to be hereinafter described, back and forth to adjust for various interpupillary distances which are indicated by means of an index mark 22 on arm 20 cooperating with a suitable scale 23 on tube 10.

Mounted on the tube 10 at a point midway between the two ends thereof is the clamping member 24 which has the two yielding, oppositely disposed portions 25 and 25' having aligned openings 26 and 26', respectively. A rod 27 which is exteriorly threaded as at 28 passes freely through the opening 26 but is threadedly secured to the portion 25' and held securely thereto by means of screw 29. A threaded finger piece or nut 30 cooperates with the threads 28 on rod 27 so that by tightening nut 30 the member 24 may be securely clamped to the tube 10. A slot 31 at the rear of member 24 cooperates with a screw 32, fixed to tube 10, to prevent lateral movement of member 24 and limit the rotation of member 24 with respect to the tube 10.

A bushing 33, which is soldered inside one end of tube 27, provides a bearing for receiving the rotatable rod 34. The lower portion of rod 34 is provided with screw threads 35 and a knurled knob or finger piece 36 is secured to one end of rod 34 by a set screw 37 thereby preventing a longitudinal or axial movement of the rod 34 but permitting it to be rotated.

A rod 38 is mounted for slidable movement within tube 27, as will hereinafter be described. The upper end of rod 38 is provided with threads 39 for cooperation with the threads 35 on rod 34. Below the threaded portion 39, the rod 38 has a recess 40 into which the lower threaded end of rod 34 projects, while at the lower end of rod 38 the nose piece 41 is pivotally mounted. From the foregoing, it will be apparent that rotation of the knob 36 will cause the rod 38 to be moved up or down within the tube 27 thereby adjusting the vertical position of the nose piece 41. A screw 42 mounted in tube 27 projects into a slot 43 which is formed in rod 38 in order to prevent rotation of rod 38 with respect to tube 27, while still permitting the vertical movement of rod 38 within tube 27.

The circular portion 20' has an integral rearward extension 44 to which the tubular bearing member 45 is secured by means of screws 46. Rotatably mounted in the bearing member 45 is the pinion shaft 47 having a pinion 48 fixed to one end thereof and a knurled knob or finger piece 49 fixed to the other end.

The lens cell comprises a ring 50 which is rotatably mounted in circular portion 20' and carries a spring clip 51 and a rigid post 52 for holding the test lenses. Secured to the rear side of ring 50 are the circularly disposed teeth 53 which are adapted to cooperate with pinion 48 so that rotation of the knob 49 will cause rotation of the lens cell carrying the test lenses. The location of the axis of cylindrical test lenses can be determined by means of the stationary, circular scale 54. Test lenses may also be held by clips 55 which are formed integral with circular portion 20'.

A split block member 56, having the two oppositely disposed extensions 57 and 57' is mounted for rotation around the outside of tubular bearing member 45, lateral movement of member 56 being prevented by washer 58 and the integral shoulder 59 on the member 45, as shown in Fig. 7. A thumb screw 60 is mounted on member 56 so that by tightening it the two extensions 57 and 57' are brought towards each other to produce a clamping action, thereby permitting member 56 to be firmly held in any adjusted position on the tubular member 45. A suitable temple 61, shown broken away, is pivotally mounted on block member 56 by means of a pintle 62.

In using my improved trial frame, various adjustments can readily be made so as to insure a proper fitting of the frame on the wearer. Thus, by turning the knob 36 the nose piece 41 can be raised or lowered in a general vertical direction and such movement can be easily controlled. By loosening the nut 30 the clamping member 24 is released so that the entire nose piece assembly can be turned about a horizontal axis and tilted inward or outward from the face of the wearer until a proper fit is obtained. The compact and convenient structure of my nose piece assembly constitutes one of the features of my invention. The temple 61 can be easily adjusted by loosening the screw 60 and then tightening the screw to hold the temple in the desired angular position.

Each lens cell can be individually adjusted for interpupillary distance by turning its knob 18.

From the foregoing it will be apparent that I am able to attain the objects of my invention and provide a trial frame which will be simple and compact in structure and adapted for convenient and accurate manipulation. It is obvious that various modifications can be made without departing from the spirit of the invention as pointed out in the appended claims.

I claim:

1. In a trial frame, the combination of a clamping member having oppositely disposed extensions provided with threaded apertures, an exteriorly threaded tube secured in the apertures of said extensions, a threaded nut cooperating with the threads of said tube and a nose piece supported by said tube.

2. A trial frame comprising a cylindrical supporting member having lens cells and temples mounted theron, a clamping member carried by said supporting member and adapted to be secured in adjusted position thereon, an internally threaded tube movably mounted on said clamping member, a rotatably mounted screw cooperating with said threaded tube and a nose piece carried by said tube.

3. A trial frame having in combination a support, an arm adjustably mounted on said support, a lens cell rotatably mounted on said arm, a tubular member secured to said arm, means rotatably mounted within said tubular member for rotating said cell, a split block mounted to turn on said tubular member, means for clamping said block in adjusted position on said tubular member and a temple secured to said block.

4. In a trial frame the combination of a support, a clamping member mounted on said support, said member having two extensions provided with threaded apertures, a threaded tube secured in said apertures, a nut cooperating with said threaded tube whereby said member may be clamped in selected position, a member movably mounted within said tube, a nose piece secured to said last named member and means on said tube for adjusting said last mentioned member.

CARL H. O. WITTIG.